| United States Patent [19] | [11] | 4,251,499 |
|---|---|---|
| Nanne et al. | [45] | Feb. 17, 1981 |

[54] PROCESS FOR THE PREPARATION OF FERRIERITE

[75] Inventors: Johannes M. Nanne; Martin F. M. Post; Willem H. J. Stork, all of Amsterdam, Netherlands

[73] Assignee: Shell Oil Company, Houston, Tex.

[21] Appl. No.: 99,270

[22] Filed: Dec. 3, 1979

[30] Foreign Application Priority Data

Dec. 14, 1978 [NL] Netherlands ............................ 782162

[51] Int. Cl.$^3$ ................................................ C01B 33/28
[52] U.S. Cl. .................................. 423/329; 252/455 Z; 423/328; 546/11
[58] Field of Search ................................ 423/328–330; 546/11; 253/431 N, 455 Z

[56] References Cited

U.S. PATENT DOCUMENTS

| 3,933,974 | 1/1976 | Winquist ........................... 423/329 X |
| 3,966,883 | 6/1976 | Vaughan .............................. 423/329 |
| 4,000,248 | 12/1976 | Martin .................................... 42/328 |
| 4,016,245 | 4/1976 | Plank et al. ........................... 423/328 |
| 4,017,590 | 4/1977 | Cormier et al. ....................... 423/329 |
| 4,046,859 | 9/1977 | Plank et al. ......................... 423/328 |

*Primary Examiner*—Edward J. Meros
*Attorney, Agent, or Firm*—Ronald R. Reper

[57] ABSTRACT

A Process is disclosed for the preparation of zeolite ferrierite of high purity by hydrothermal crystallization from a starting mixture containing at least one compound selected from piperidine and alkyl-substituted piperidines.

5 Claims, No Drawings

PROCESS FOR THE PREPARATION OF FERRIERITE

BACKGROUND OF THE INVENTION

The invention relates to a process for the preparation of ferrierite.

Ferrierite is a crystalline aluminosilicate zeolite, which is used, inter alia, as adsorbent and as catalyst or catalyst carrier. Methods for its preparation are disclosed, e.g., in Journal of Catalysts, Vol. 35, 256–272 (1974), U.S. Pat. Nos. 3,933,974 and 4,000,248. It is known that ferrierite can be prepared by maintaining an aqueous mixture containing one or more alkali metal compounds, one or more aluminum compounds and one or more silicon compounds in a given ratio at elevated temperature until the ferrierite has been formed and subsequently by separating the ferrierite crystals from the motor liquor. This procedure has three drawbacks, which are connected with the reaction temperature, with the purity and the molar $SiO_2/Al_2O_3$ ratio of the ferrierite. As regards the reaction temperature it has been found that this procedure requires temperatures higher than 300° C. These high reaction temperatures involve the use of high pressures, which necessitates the use of expensive high-pressure equipment. As regards the molar $SiO_2/Al_2O_3$ ratio of the ferrierite it has been found that this procedure produces as a rule ferrierite with a molar $SiO_2/Al_2O_3$ ratio lower than 15. When the ferrierite is used for catalytic purposes, a ferrierite with a higher molar $SiO_2/Al_2O_3$ ratio is needed in view of the catalyst stability. In the above-mentioned procedure the purity of the ferrierite leaves also much to be desired. As a rule a solid product is obtained consisting of less than 80 %w ferrierite.

The applicants have done an inestigation concerning the preparation of ferrierite. In this investigation a procedure was found which means a considerable improvement in connection with each of the three above-mentioned drawbacks.

SUMMARY OF THE INVENTION

The present patent application therefore relates to a process for the preparation of ferrierite which comprises maintaining at a temperature of 100°–200° C. an aqueous mixture which contains one or more compounds of an alkali metal(M), one or more aluminum compounds, one or more silicon compounds and at least one compound selected from piperidine and alkyl-substituted piperidine wherein in the mixture the various compounds are present in the following molar ratio, expressed in moles of the oxides, with the exception of piperidine and alkyl-substituted piperidines:

$SiO_2:Al_2O_3 > 15$;
$H_2O:SiO_2 = 5-500$;
$NR:SiO_2 = 0.05-10$, and
$M_2O:Al_2O_3 > 1$, until the ferrierite has formed, and separating the ferrierite crystals from the mother liquor.

DESCRIPTION OF THE PREFERRED EMBODIMENTS

In the preparation of ferrierite according to the invention one of the essential things is that the aqueous mixture that is used as the starting material, contains piperidine and/or one or more alkyl-substituted piperidines. As regards the required presence of piperidine and/or alkyl-substituted piperidines in the aqueous mixture it has been found that, if in this mixture the compounds mentioned are replaced by closely related heterocyclic nitrogen compounds such as pyrrole, imidazole, pyridine or pyrrolidone, either no ferrierite at all is formed, or the ferrierite obtained is highly contaminated with other zeolitic and/or amorphous material.

If it is desired in the preparation of ferrierite according to the invention to use an alkyl-substituted piperidine, both alkyl piperidines containing only one alkyl substituent, and alkyl piperidines containing two or more alkyl substituents are eligible for this purpose. If the alkyl piperidines contain only one alkyl substituent this alkyl substituent may be present both at the nitrogen atom and at one of the carbon atoms of the piperidine. Examples of suitable monoalkyl piperidines in which the alkyl substituent is bonded to a carbon atom of the piperidine are 2-methyl, 3-methyl, 4-methyl, 2-ethyl, 3-ethyl and 2-propyl piperidine. Examples of suitable monoalkyl piperidines in which the alkyl substituent is bonded to the nitrogen atom of the piperidine are: 1-methyl, 1-ethyl, 1-propyl, 1-butyl, 1-pencyl, 1-octyl and 1-dodecyl piperidine. If it is desired in the preparation of ferrierite according to the invention to use an alkyl-substituted piperidine containing two or more alkyl substituents, eligible alkyl piperidines for this purpose are those in which all alkyl substituents are present at carbon atoms of the piperidine and those in which one of the alkyl substituents is present at the nitrogen atom of the piperidine and the rest of the alkyl substituents at carbon atoms of the piperidine. An example of a suitable alkyl-substituted piperidine of the latter group is 1,2-dimethyl piperidine. If the ferrierite preparation according to the invention is carried out using an alkyl-substituted piperidine, it is preferred to use a methyl piperidine for this purpose.

Eligible alkali metal, silicon and aluminum compounds which should be incorporated into the aqueous mixture from which ferrierite is prepared according to the invention, are, in principle, all such compounds as have been used already in the past in the zeolite preparation. The alkali metal compound that is preferably used in a sodium compound. For the silicon compound and the aluminum compound preference is given to sodium water glass and aluminum sulphate. In this procedure the usual starting material is an aqueous mixture containing one or more compounds of an alkali metal (M), one or more aluminum compounds and one or more silicon compounds. Moreover, piperidine and/or one or more alkyl-substituted piperidines (NR) are incorporated into the aqueous mixture. The amounts of the various compounds in the aqueous mixture should be chosen such that the following requirements with respect to molar ratios are satisfied, expressed in moles of the oxides, with the exception of piperidine and alkyl-substituted piperidines:

$SiO_2:Al_2O_3 > 15$,
$H_2O:SiO_2 = 5-500$,
$NR:SiO_2 = 0.05-1.0$, and $M_2O:Al_2O_3 > 1$ A solid product consisting of more than 90%w ferrierite is formed by heating the aqueous mixture at a temperature between 100° and 200° C. The ferrierite has a molar $SiO_2/Al_2O_3$ ratio higher than 20.

Preferably the amounts of the various components in the aqueous starting mixture according to the invention are in the following ratio, expressed in moles of the oxides, with the exception of piperidine and alkyl-substituted piperidines:

$SiO_2:Al_2O_3 > 20$,
$H_2O:SiO_2 = 10-100$, and $NR:SiO_2-0.2-0.6$

Ferrierite is a zeolite of the molecular sieve type whose accessibility is determined by pores having a diameter of about 0.6 nm. Ferrierite is very suitable as catalyst or catalyst carrier in a variety of catalytic processes. In view of the uniform pore diameter of ferrierite, this material is especially important for selectivity carrying out catalytic processes in which, either from a mixture of compounds with linear and branched structures substantially the compounds with linear structure are converted, or in which from a compound substantially compounds with linear structure are formed. Examples of such catalytic processes are selective (hydro)-cracking and dehydrogenation of n-paraffins. When ferrierite is used as a catalyst or catalyst carrier preference is given to a material whose alkali metal content has been reduced to less than 1%w and in particular to less than 0.05%w. Reducing the alkali metal content of ferrierite can conveniently be done by contacting the ferrierite once or several times with a solution containing ammonium ions and calcining the $NH_4^+$ ferrierite thus obtained, which forms the $H^+$ ferrierite. When ferrierite is used for catalytic purposes this is preferably done as carrier material for one or more catalytically active metal components. Ferrierite is very suitable for use as catalyst carrier in hydrocarbon conversion processes such as cracking, isomerization, dealkylation and hydrocracking. To this end one or more active metal components which impart hydrogenation-dehydrogenation properties to the ready catalyst are deposited on the ferrierite. Very suitable for this purpose are one or more metals of Groups VIB, VIIB and VIII of the Periodic Table. The ferrierite-based catalysts are especially important for converting hydrocarbons by hydrocracking. As a result of the uniform pore diameter of ferrierite these catalysts are pre-eminently suitable for selectively hydrocracking substantially n-parafins in hydrocarbon oils consisting of mixtures of n-parraffins and other hydrocarbons (catalytic dewaxing).

In addition to the use of ferrierite as the carrier for catalysts for converting hydrocarbons, an important application of this material lies in the use as molecular sieve for separating compounds with a substantially unbranched structure from mixtures of these compounds with related structures with branched and/or cyclic structure. For this application the ferrierite should at least partially be dehydrated.

The invention will now be explained with reference to the following examples. All examples were carried out as follows: An organic nitrogen compound was incorporated with stirring into a solution of sodium water glass (28%w $SiO_2$; 8%w $Na_2O$) in water. To the mixture thus obtained a solution of aluminum sulphate in water or in a mixture of water and sulphuric acid was added with stirring. The resultant mixture was stirred for another 15 minutes and then maintained for a certain time at a temperature of 150° C. The solid product was isolated from the reaction mixture.

The composition of the starting mixtures, the reaction time used, the composition of the isolated product and the molar $SiO_2/Al_2O_3$ ratio of the ferrierite are given in the table below.

Of the examples 1–13 given in the table examples 1–9 are according to the invention. Examples 10–13 have been included for comparison.

| Example No. | Molar composition of the starting mixture | Reaction time, h | Composition of the isolated solid product, % w | Molar $SiO_2/Al_2O_3$ ratio of the ferrierite |
|---|---|---|---|---|
| 1 | 93.5 $SiO_2$ . 0.5 $Al_2O_3$ . 21.4 $Na_2O$ . 5.6 $Na_2SO_4$ . 36.7 piperidine . 1938 $H_2O$ | 113 | Ferrierite : 100 | 40 |
| 2 | 93.5 $SiO_2$ . $Al_2O_3$ . 10 $Na_2O$ . 17 $Na_2SO_4$ . 36.7 piperidine . 1938 $H_2O$ | 113 | Ferrierite : 100 | 48 |
| 3 | 93.5 $SiO_2$ . $Al_2O_3$ . 21.4 $Na_2O$ . 5.6 $Na_2SO_4$ 36.7 piperidine . 1938 $H_2O$ | 113 | Ferrierite : 100 | 30 |
| 4 | 93.5 $SiO_2$ . $Al_2O_3$ . 24 $Na_2O$ . 3 $Na_2SO_4$ . 36.7 piperidine . 1938 $H_2O$ | 113 | Ferrierite : 100 | 27 |
| 5 | 60 $SiO_2$ . $Al_2O_3$ . 2.7 $Na_2O$ . 14.6 $Na_2SO_4$ . 36.7 piperidine . 1938 $H_2O$ | 113 | Ferrierite : 100 | 69 |
| 6 | 60 $SiO_2$ . $Al_2O_3$ . 6.6 $Na_2O$ . 10.7 $Na_2SO_4$ . 36.7 piperidine . 1938 $H_2O$ | 113 | Ferrierite : 100 | 47 |
| 7 | 93.5 $SiO_2$ . 2 $Al_2O_3$ . 10 $Na_2O$ . 17 $Na_2SO_4$ . 36.7 piperidine . 1938 $H_2O$ | 113 | Ferrierite : 100 | 34 |
| 8 | 93.5 $SiO_2$ . 2 $Al_2O_3$ . 17.7 $Na_2O$ . 9.3 $Na_2SO_4$ . 36.7 piperidine . 1938 $H_2O$ | 113 | Ferrierite : 100 | 25 |
| 9 | 93.5 $SiO_2$ . 4 $Al_2O_3$ . 10 $Na_2O$ . 17 $Na_2SO_4$ . 36.7 piperidine . 1938 $H_2O$ | 113 | Ferrierite: 100 | 22 |
| 10 | 93.5 $SiO_2$ . $Al_2O_3$ . 7.4 $Na_2O$ . 19.6 $Na_2SO_4$ . 36.7 pyrrole . 1938 $H_2O$ | 140 | Ferrierite : 50 Amorphous material : 50 | |
| 11 | 93.5 $SiO_2$ . $Al_2O_3$ . 7.4 $Na_2O$ . 19.6 $Na_2SO_4$ . 36.7 imidazole . 1938 $H_2O$ | 140 | Ferrierite : 0 Other zeolitic material : 80 Amorphous material : 20 | |
| 12 | 93.5 $SiO_2$ . $Al_2O_3$ . 7.4 $Na_2O$ . 19.6 $Na_2SO_4$ . 36.7 pyridine . 1938 $H_2O$ | 140 | Ferrierite : 50 Other zeolitic material : 30 Amorphous material : 20 | |
| 13 | 93.5 $SiO_2$ . $Al_2O_3$ . 7.4 $Na_2O$ . 19.6 $Na_2SO_4$ . 36.7 pyrrolidone . 1938 $H_2O$ | 140 | Ferrierite : 30 Other zeolitic material - quartz : 50 Amorphous material : 20 | |

What is claimed is:

1. A process for the preparation of ferrierite which comprises maintaining an aqueous mixture at a temperature of 100°–200° C. which contains one or more compounds of an alkali metal (M), one or more aluminum compounds, one or more silicon compounds and at least one compound (NR) selected from piperidine and alkyl-substituted piperidines wherein in the mixture the various compounds are present in the following molar ratio, expressed in moles of the oxides, with the exception of piperidine and alkyl-substituted piperidines:

$SiO_2:Al_2O_3 > 15$;

$H_2O:SiO_2 = 5-500$;

$NR:SiO_2 = 0.05-1.0$, and $M_2O:Al_2O_3 > 1$;

until the ferrierite has formed, and separating the ferrierite crystals from the mother liquor.

2. A process according to claim 1 wherein the starting mixture contains a methyl piperidine.

3. A process according to claim 1 wherein the starting mixture contains a sodium compound as alkali metal compound.

4. A process according to claim 1 wherein the starting mixture contains sodium water glass as silicon compound and aluminum sulphate as aluminum compound.

5. A process according to claim 1 wherein in the aqueous mixture the various compounds are present in the following molar ratio, expressed in moles of the oxides, with the exception of piperidine and alkyl-substituted piperidines:

$SiO_2:Al_2O_3 > 20$, $H_2O:SiO_2 = 10-100$, and $NR:SiO_2 = 0.2-0.6$.

* * * * *